No. 671,946. Patented Apr. 9, 1901.
C. E. HOLLAND.
ELECTROLYTIC WATER PURIFYING AND FILTERING APPARATUS.
(Application filed Nov. 28, 1900.)
(No Model.)

Witnesses:

Inventor:
Charles Edward Holland

UNITED STATES PATENT OFFICE.

CHARLES EDWIN HOLLAND, OF NEW YORK, N. Y.

ELECTROLYTIC WATER PURIFYING AND FILTERING APPARATUS.

SPECIFICATION forming part of Letters Patent No. 671,946, dated April 9, 1901.

Application filed November 28, 1900. Serial No. 38,004. (No model.)

*To all whom it may concern:*

Be it known that I, CHARLES EDWIN HOLLAND, a citizen of the United States, and a resident of 245 West One Hundred and Sixteenth street, New York, in the county of New York and State of New York, have invented certain new and useful Improvements in Electrolytic Water Purifying and Filtering Apparatus, of which the following is a specification.

The object of this invention is to provide a cheap, simple, and efficient means for purifying water by electrolysis within the compass of an ordinary portable filtering-receptacle, thus adapting it for use in private residences or in other places where only a limited amount of water is consumed. It has been demonstrated that the purification of water by electrolysis is most efficient; but heretofore it has been utilized only in a large way, and the structural arrangements have been too expensive to be employed in small units and not adaptable for residences without a special electrical equipment in the same building. The invention therefore provides a complete apparatus which contains within itself a battery, water-conduits, electrical elements for the circuit, and filtering-compartments, whereby the work of purification and subsequent filtration is performed without any other care and attention than is required in a common filter, as will now be set forth in detail.

Figure 1:
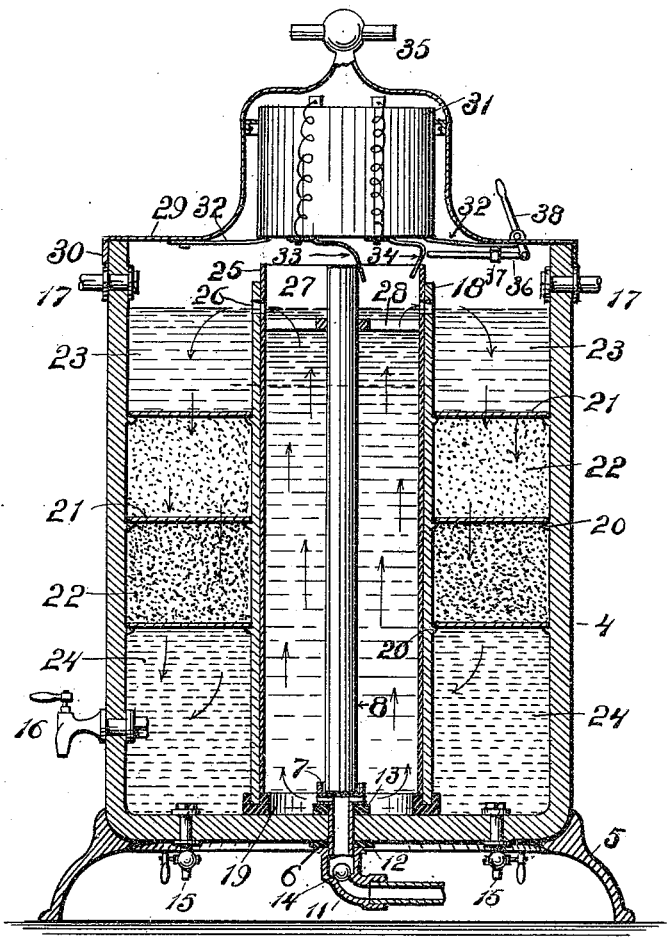
Figure 2:
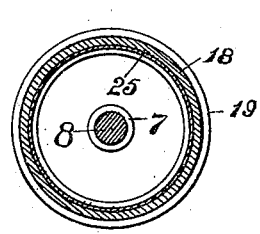
Figure 3:
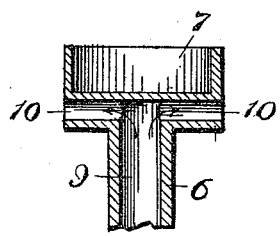

In the accompanying drawings, Figure 1 is a central vertical section of my improved water purifier and filter. Fig. 2 is a horizontal section of the inner tube and metal lining, and Fig. 3 a vertical section of the supply-tube and rest for one of the electrical elements.

In constructing the invention I provide a glass receptacle 4 of any suitable size, open at its upper end, which is mounted on a base 5 and has centrally in the bottom a tubular connection with the main or source of water-supply. The tube 6, which passes through the bottom, is provided with a socket 7 at its upper end, which is designed to hold the metallic element 8. The bore 9 of the tube 6 has lateral apertures 10, so that the water can freely pass into the inner or central chamber. The tube is secured to the bottom by means of an L connection 11, rubber gaskets 12 13 being placed on opposite sides of the base to prevent leakage. The L connection has, preferably, therein a check-valve 14. The base of the glass receptacle has also one or more tap connections, as shown at 15, so that water may be drawn from the exterior chamber of the filter. At one side, near the base, is a tap 16, and near the top I also place one or more taps 17. Within the receptacle thus constructed I place a vertical glass cylinder 18, open at both ends, the lower end thereof being mounted in a grooved annular ring 19, composed of rubber or other suitable material. Externally this cylinder has three circumferential ribs 20 a suitable distance apart, and the interior surface of the receptacle 4 has similar ribs, which are designed to hold the partitions 21. These partitions are preferably made of asbestos cloth or other material through which water can percolate. If asbestos cloth is used, some rigid supporting-plate should be placed below the asbestos cloth to hold up the same, and these partitions rest on the ribs 20. The spaces between the partitions are filled with any suitable filtering material, as shown at 22, thus leaving a water-compartment 23 above and a water-compartment 24 below the filtering-strata.

Within the glass cylinder 18 I place an aluminium cylinder 25, the upper end of which projects slightly above the glass cylinder, and one or more holes 26 are formed through the glass and aluminium cylinders, so that water will flow from the inner chamber 27 to the outer chamber 23. The central element 8 is a bar of aluminium, the lower end of which rests in the cup 7, and the upper end is held in place by means of a spider 28.

The cover 29 of the apparatus has a flanged rim 30, so that it will fit snugly over the glass receptacle 4. It is so spun as to provide for placing a chemical battery 31 in the dome, as shown, said battery being held in place by means of fingers 32, which project from the base portion of the cover, the object being to render the battery removable when it is necessary to clean or repair same. On the base of the battery are secured two spring-fingers 33 34, one of the fingers being in position to engage with the bar 8 and the other finger to make contact with the aluminium cylinder 25 when the cover is placed on the glass receptacle 4. The apex of the cover has a cross-bar 35, which serves as a handle when it is desired to remove the cover.

As it is desirable to disconnect the battery from the elements at certain times, a switch-bar 36 is located below the cover, the bar passing through a keeper 37 and the inner end thereof engaging with one of the spring-fingers, as shown, while the outer end of the bar is hinged to the lower end of a lever 38, which projects through the cover and by means of which the finger 34 is disengaged from the aluminium cylinder 25.

It will thus be seen that the entire apparatus for purifying as well as for filtering is combined, and that no binding screws or adjustments are required after the battery is once placed within the dome, as the contact-fingers will engage with the elements in whatever position the cover may be applied.

The operation of the apparatus is very simple. Water is admitted through the central tube in the bottom, enters the chamber 27, and passes upwardly, during which time it is subjected to the electric treatment of the battery. It then passes through the apertures 26 and enters the chamber 23, thence through the filtering-strata 22 and into the withdrawing-reservoir 24. All coagulated matter will remain in the upper chamber 23 to be removed at intervals, while the mineral matter, salts, and heavier matter will be deposited within the base of the chamber 27. The coagulated matter in the chamber 23 may be removed through the pipes 17 or the cover removed for that purpose. Any sedimentary deposit which may find its way into the chamber 24 can be removed through the pipes 15.

What I claim as new is—

1. A purifying and filtering apparatus comprising an insulating-cylinder, a central vertical tubular electrode secured therein, and an electrode within said tubular electrode, an outer surrounding chamber divided by horizontal partitions and having filtering material in one or more of the compartments thus formed, and passages between the tubular electrode and the filtering-chamber, as set forth.

2. A purifying and filtering apparatus having a central vertical tubular electrode secured within an insulating-cylinder, and an electrode within said tubular electrode, a surrounding chamber subdivided by horizontal partitions and having filtering material in one or more of the compartments thus formed, a supply connection at the bottom of the tubular electrode, means for discharging water from the purifying vessel into the surrounding chamber and faucet connection at the base of said outer chamber, as set forth.

3. A purifying apparatus comprising an exterior shell and an inner insulating-cylinder and passages for the flow of water from the purifying apparatus into the reservoir constituted by said shell, a tubular electrode within the insulating-cylinder constituting one of the electrical elements, and a central vertical bar within the tubular electrode constituting the other element, means for conducting the water upwardly through the tubular electrode, a battery and connections between the battery and electrodes, substantially as set forth.

4. A purifying apparatus comprising an outer shell or casing having centrally through the base a supply-tube, an insulating-cylinder within said casing, a tubular electrode within said insulating-cylinder, a central vertical metallic element within the tubular electrode, passages for the water between the internal and external chambers, and a removable cover having a battery and suitable connections, as shown.

5. A purifying and filtering apparatus comprising an outer shell or casing having centrally through the base a supply-tube and a check-valve therein, said supply-tube having a socketed head to receive one of the metallic electrodes, in combination with said metallic electrode, a surrounding tubular electrode, a battery connected with said electrodes, an exterior or surrounding filtering-chamber and passages for the water between the internal and external chamber, as set forth.

6. A purifying and filtering apparatus comprising an outer shell or casing having a supply-pipe centrally through the base, a vertical tubular electrode within the casing, a central vertical electrode within socketed at the base of the tubular electrode and held at its upper end by a spider, surrounding filtering-chambers having therein filtering material, and a water-inlet between the electrolytic cell and the outer surrounding-chamber for the passage of water from the former to the latter, with suitable discharge and flushing outlets, and passages for the water between the internal and external chambers, and a battery connected with the electrodes, as set forth.

7. A purifying and filtering apparatus comprising an outer shell or casing and an inner insulating-cylinder, said insulating-cylinder having therein suitable elements for treating water electrically, the exterior chamber having a water-space above and below and intermediate filtering strata, and passages for the water between the internal and external chambers, substantially as set forth.

8. A purifying and filtering apparatus comprising an outer shell or casing having centrally through the base a supply-pipe, a central vertical insulating-cylinder and a tubular electrode within the same, a chamber surrounding said insulating-cylinder, an electrode within the tubular electrode, apertures through the upper end of the insulating-cylinder and tubular electrode, for conducting water from the interior of the tubular electrode to the surrounding chamber, said chamber having midway between the upper and lower filtering strata, flushing-taps at the upper and lower end of the outer shell, and a battery in the cover thereof, as set forth.

9. A purifying and filtering apparatus comprising an exterior shell or casing of insulating material, a vertical tubular electrode of aluminium surrounded by insulating material and constituting one of the electrodes, a central vertical bar of aluminium, constituting the other electrode, a surrounding chamber provied with filtering material, and passages between the internal and external chambers, as set forth.

Signed at New York, in the county of New York and State of New York, this 22d day of November, A. D. 1900.

CHARLES EDWIN HOLLAND.

Witnesses:
W. S. WARWICK,
F. J. LIEBMAN.